United States Patent
Dubba et al.

(10) Patent No.: US 12,430,148 B2
(45) Date of Patent: Sep. 30, 2025

(54) SYSTEMS AND METHODS FOR DETERMINING GUI INTERACTION INFORMATION FOR AN END USER DEVICE

(71) Applicant: BLUE PRISM LIMITED, Warrington (GB)

(72) Inventors: Krishna Sandeep Reddy Dubba, Warrington (GB); Benjamin Michael Carr, Warrington (GB); Ümit Rusen Aktas, Warrington (GB); Thomas Alexander Chiles, Warrington (GB)

(73) Assignee: BLUE PRISM LIMITED, Warrington (GB)

( * ) Notice: Subject to any disclaimer, the term of this patent is extended or adjusted under 35 U.S.C. 154(b) by 111 days.

(21) Appl. No.: 17/891,008

(22) Filed: Aug. 18, 2022

(65) Prior Publication Data
US 2023/0054688 A1    Feb. 23, 2023

(30) Foreign Application Priority Data
Aug. 18, 2021 (GB) .................................... 2111831

(51) Int. Cl.
*G06F 9/451* (2018.01)
*G06F 3/0484* (2022.01)
*G06V 10/764* (2022.01)

(52) U.S. Cl.
CPC ............ *G06F 9/451* (2018.02); *G06F 3/0484* (2013.01); *G06V 10/764* (2022.01)

(58) Field of Classification Search
CPC .... G06F 9/451; G06F 3/0484; G06F 3/04842; G06V 10/76; G06V 10/764
See application file for complete search history.

(56) References Cited

U.S. PATENT DOCUMENTS

| | | | |
|---|---|---|---|
| 11,200,539 B2 * | 12/2021 | Iyer | G06Q 10/0633 |
| 2010/0125802 A1 * | 5/2010 | Huslak | G06F 16/954 |
| | | | 709/218 |
| 2012/0131456 A1 | 5/2012 | Lin et al. | |
| 2018/0173403 A1 * | 6/2018 | Carbune | G06Q 50/12 |
| 2018/0370029 A1 * | 12/2018 | Hall | G06F 11/0715 |
| 2019/0324781 A1 * | 10/2019 | Ramamurthy | G06N 3/0454 |

(Continued)

FOREIGN PATENT DOCUMENTS

| | | |
|---|---|---|
| EP | 3418896 A1 | 12/2018 |
| EP | 3767449 A1 | 1/2021 |
| WO | WO 2019/234736 A1 | 12/2019 |

OTHER PUBLICATIONS

Great Britain Patent Application No. 2111831.0; Combined Search Report and Examination Report; dated Dec. 29, 2021; 9 pages.

(Continued)

*Primary Examiner* — Tan H Tran
(74) *Attorney, Agent, or Firm* — BakerHostetler (57) ABSTRACT

A computer implemented method for determining graphical user interface, GUI, interaction information for an end user device is described. The method comprising analysing device state information using one or more GUI spying modes to estimate GUI interaction information for the one or more GUI spying modes; classifying the estimated GUI interaction information for the one or more GUI spying modes based on a reference model; and outputting GUI interaction information based on the classification results.

16 Claims, 6 Drawing Sheets

(56) References Cited

U.S. PATENT DOCUMENTS

| | | |
|---|---|---|
| 2020/0159647 A1 | 5/2020 | Puszkiewicz et al. |
| 2020/0285353 A1 | 9/2020 | Rezazadeh et al. |
| 2020/0311210 A1* | 10/2020 | Nama .................... G06F 40/289 |
| 2020/0371818 A1* | 11/2020 | Banne ..................... G06F 40/20 |
| 2021/0074064 A1 | 3/2021 | Iyer et al. |
| 2021/0081294 A1* | 3/2021 | Golubev ............. G06F 11/3688 |

OTHER PUBLICATIONS

International Patent Application No. PCT/GB2022/052147; Int'l Search Report and the Written Opinion; dated Nov. 18, 2022; 19 pages.

* cited by examiner

SYSTEMS AND METHODS FOR DETERMINING GUI INTERACTION INFORMATION FOR AN END USER DEVICE

FIELD OF THE INVENTION

The present invention relates to systems and methods for determining GUI interaction information for end user devices.

BACKGROUND OF THE INVENTION

Graphical user interfaces (GUIs) for end user devices allow operators (i.e. human operators) to use end user devices to carry out processes that can involve complex data processing and/or systems control tasks. However, whilst GUIs allow operators to quickly become accustomed to carrying out new processes, they pose a challenge to further automation of said processes due to the non-singular and diverse nature by which said processes can be performed from the perspective of the operator interacting with the GUI.

Intelligent process capture and automation platforms, such as "Blue Prism Capture", provide systems that represent an evolution of traditional process automation approaches by using software agents to interact with end user devices via their existing GUIs to perform given processes. Such software agents are able to generate the appropriate input commands (to an end user device) for a GUI of the end user device to cause a given process to be carried out by the end user device and thus, enable the automation of said process. In order to be able to generate the appropriate input commands for a given process to be automatically performed, intelligent process capture and automation platforms must first "capture" the process during a manual demonstration of the process by an operator. More specifically, this requires intelligent process capture and automation platforms to analyse the end user device state, i.e. the GUI state and the various user inputs to the end user device, over the course of a manual demonstration of a given process to determine the series of GUI interactions that take place to carry out said process.

Such processes often involve operator interaction with a plurality of end user device applications via a plurality of user inputs, each application having its own GUI-elements for interaction therewith. Intelligent process capture and automation platforms, such as "Blue Prism Capture", rely on GUI "spying modes", i.e., modes of monitoring the GUI and GUI-element interaction of an end user device, to determine the nature of GUI interaction taking place during the manual demonstration of a process. Such GUI spying modes may include low-level APIs such as Win32, UIA, Browser (html) or Active Accessibility, which directly access GUI-element attributes through programmatic interfaces. The GUI spying modes can also include modes that require post-processing of GUI screenshots, such as the use of an OCR model for analysing GUI pixel data to obtain, for example, visible textual information of a GUI-element or the use of a computer vision tool for analysing GUI pixel data to identify and extract GUI-element attributes.

A problem arises in that it is not known which GUI spying modes will work best for a given GUI-element of a given application. For instance, UIA may work well for certain Windows applications, e.g., Excel, but not necessarily for an application such as Pycharm or SAP, in which case it may be necessary to fall back on a computer-vision based approach for determining GUI interaction information. When a GUI spying mode does not work, depending on the mode, it can either return an error, or return results which are inaccurate, e.g., a returned GUI-element bounding box might be excessively large for a GUI-element that was interacted with.

One method that can be used to obviate this problem is to have a human operator select the appropriate GUI spying mode whilst performing and capturing the manual demonstration of a process using an intelligent process capture and automation platform. This passes the responsibility from the platform to the human operator, but at the cost of usability, as it takes longer to perform and capture a manual demonstration of a process accurately.

Accordingly, it is desirable to provide a method for inferring the optimal GUI spying mode or modes for determining a GUI interaction and thus, allowing for a more efficient and accurate determination of GUI interactions that takes place during a manual demonstration of a process.

SUMMARY OF THE INVENTION

An embodiment of the present invention provides a computer implemented method for determining graphical user interface, GUI, interaction information for an end user device comprising:
  analysing device state information using one or more GUI spying modes to estimate GUI interaction information for the one or more GUI spying modes;
  classifying the estimated GUI interaction information for the one or more GUI spying modes based on a reference model; and
  outputting GUI interaction information based on the classification results.

In a disclosed embodiment, the one or more GUI spying modes comprise Application Programming Interfaces, APIs, native to the computer, and the estimated GUI interaction information is estimated by accessing GUI interaction information from the APIs.

In a further disclosed embodiment, the one or more GUI spying modes comprise post-processing methods.

In a further disclosed embodiment, the post-processing methods comprise computer vision tools.

In a further disclosed embodiment, the reference model comprises a heuristic model based on predetermined rules.

In a further disclosed embodiment, the reference model comprises a multi-modal deep learning model trained on historic data.

In a further disclosed embodiment, analysing the device state information and classifying the corresponding estimated GUI interaction information is performed for a plurality of GUI spying modes in series.

In a further disclosed embodiment, analysing the device state information and classifying the corresponding estimated GUI interaction information is performed for a plurality of GUI spying modes in parallel.

In a further disclosed embodiment, classifying the estimated GUI interaction information based on a reference model comprises classifying the estimated GUI interaction information as either true or false.

In a further disclosed embodiment, the final GUI spying mode is a computer vision tool and wherein the corresponding estimated GUI interaction information is classified as true.

In a further disclosed embodiment, classifying the estimated GUI interaction information is terminated when a true classification is determined, and wherein outputting GUI interaction information based on the classification results comprises outputting the estimated GUI interaction information that is classified as true.

In a further disclosed embodiment, classifying the estimated GUI interaction information based on a reference model comprises assigning scores to subsets of the estimated GUI interaction information based on the reference model.

In a further disclosed embodiment, outputting GUI interaction information based on the classification results comprises outputting the classified estimated GUI information with a highest score.

In a further disclosed embodiment, outputting GUI interaction information based on the classification results comprises filtering and aggregating the classified estimated GUI interaction information based on the scores.

In a further disclosed embodiment, filtering comprises disregarding subsets of the classified estimated GUI interaction information with scores below a predetermined threshold.

In a further disclosed embodiment, outputting GUI interaction information based on the classification results comprises aggregating classified estimated GUI interaction information with scores above a predetermined threshold.

In a further disclosed embodiment, outputting GUI interaction information based on the classification results comprises outputting subsets of classified estimated GUI interaction information estimated using one or more of the plurality of GUI spying modes.

In a further disclosed embodiment, analysing device state information using one or more GUI spying modes to estimate GUI interaction information occurs at every instance of user interaction.

There is further provided, according to an embodiment of the present invention, a non-transitory computer readable medium comprising instructions for causing a computer to execute instructions according to an embodiment of the above-disclosed method.

There is further provided, according to an embodiment of the present invention, a system comprising:
a display for displaying a GUI of an end user device; and
at least one processor coupled to the display, the at least one processor configured to execute instructions according to an embodiment of the above-disclosed method.

BRIEF DESCRIPTION OF THE DRAWINGS

Embodiments of the invention will now be described, by way of example only, with reference to the accompanying drawings, in which.

DETAILED DESCRIPTION OF EMBODIMENTS OF THE INVENTION

In the description and figures that follow, certain exemplary embodiments of the invention are described.

The systems and methods described herein operate in the context of platforms for intelligent process capture and automation for end user devices. The process capture component involves capturing, i.e. recording, a manual demonstration of a given process that is performed on an end user device by an operator. During process capture, GUI interaction information is obtained, where the GUI interaction information includes the necessary information required to carry out the captured process on the end user device by way of a series of interactions with the GUI of the end user device. This GUI interaction information is subsequently used by software agents in the automation portion of the platform for the purposes of automating the captured process. The present application is concerned with the process capture portion of the platform, and more specifically, how said GUI interaction information is accurately and efficiently determined during the capture of a manual demonstration of a given process.

Figure 1:
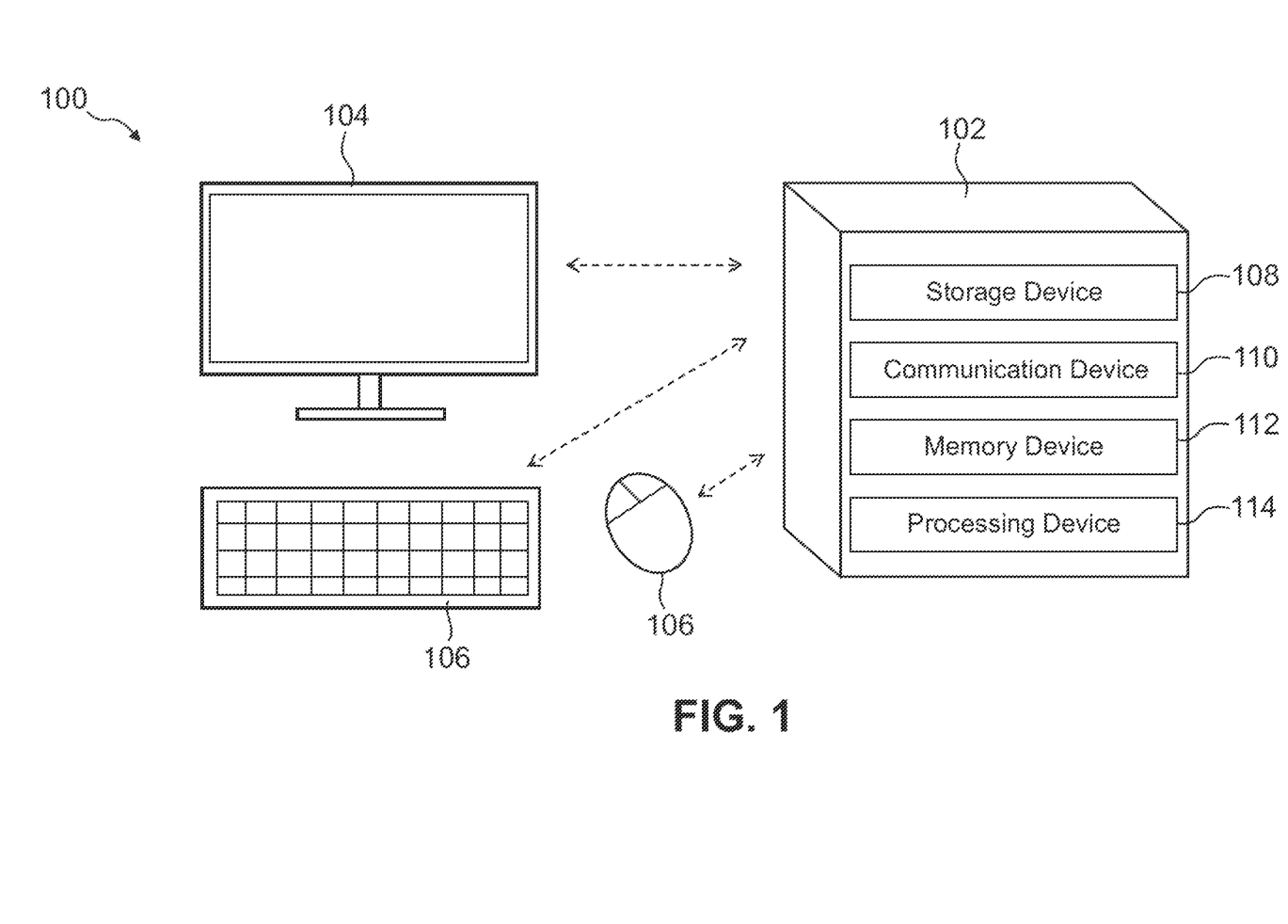
FIG. 1 schematically illustrates an example of an end user device system.

FIG. 1 schematically illustrates an example of an end user device 100. One such end user device may be a personal computer, but it will be appreciated that the end user device may include other devices such as a tablet, laptop, or other hand held device. The end user device 100 comprises a computer 102, a display 104 and user input devices 106. The computer may comprise a storage device 108, a communication device 110, a memory device 112 and a processing device 114.

The processing device 114 may include memory (e.g., read only memory (ROM) and random access memory (RAM)) for storing processor-executable instructions and one or more processors that execute the processor-executable instructions. The processing device 114 can also communicate with storage device 108. In embodiments of the invention where the processing device 114 includes two or more processors, the processors may operate in a parallel or distributed manner. The processing device 114 may execute an operating system of an end user device or software associated with other elements of an end user device.

The communication device 110 may be a device that allows the end user device 100 to communicate with interfacing devices, e.g., user input devices 106. The communication device 110 may include one or more wired or wireless transceivers for communicating with other devices in the end user device 100 (e.g. WiFi, Bluetooth, and/or Ethernet communications device). The communication device 110 may be configured to transmit data and receive data from a remote processing server or processing device (e.g. a cloud server or processing device).

The memory device 112 may be any device that stores data generated or received by components of the end user device 100 (e.g., a random access memory (RAM) device or a read only memory (ROM) device).

The storage device 108 may be any form of non-volatile data storage device such as one or more of a hard disk drive, a magnetic disc, an optical disc, a ROM, etc. The storage device 108 may store an operating system for the processing device 114 to execute in order for the end user device 100 to function. The storage device 108 may also store one or more computer programs (or software or instructions or code).

The display 104 may be any device that outputs visual data representing a graphical user interface (GUI) of an end user device. The GUI as represented on the display 104 may allow an operator to interact with the end user device.

The user input devices 106 may allow an operator to interact with the GUI of the end user device and/or other components in the end user device system 100, and may include a keyboard, mouse, trackpad, trackball, and/or other directional input devices.

Figure 2:
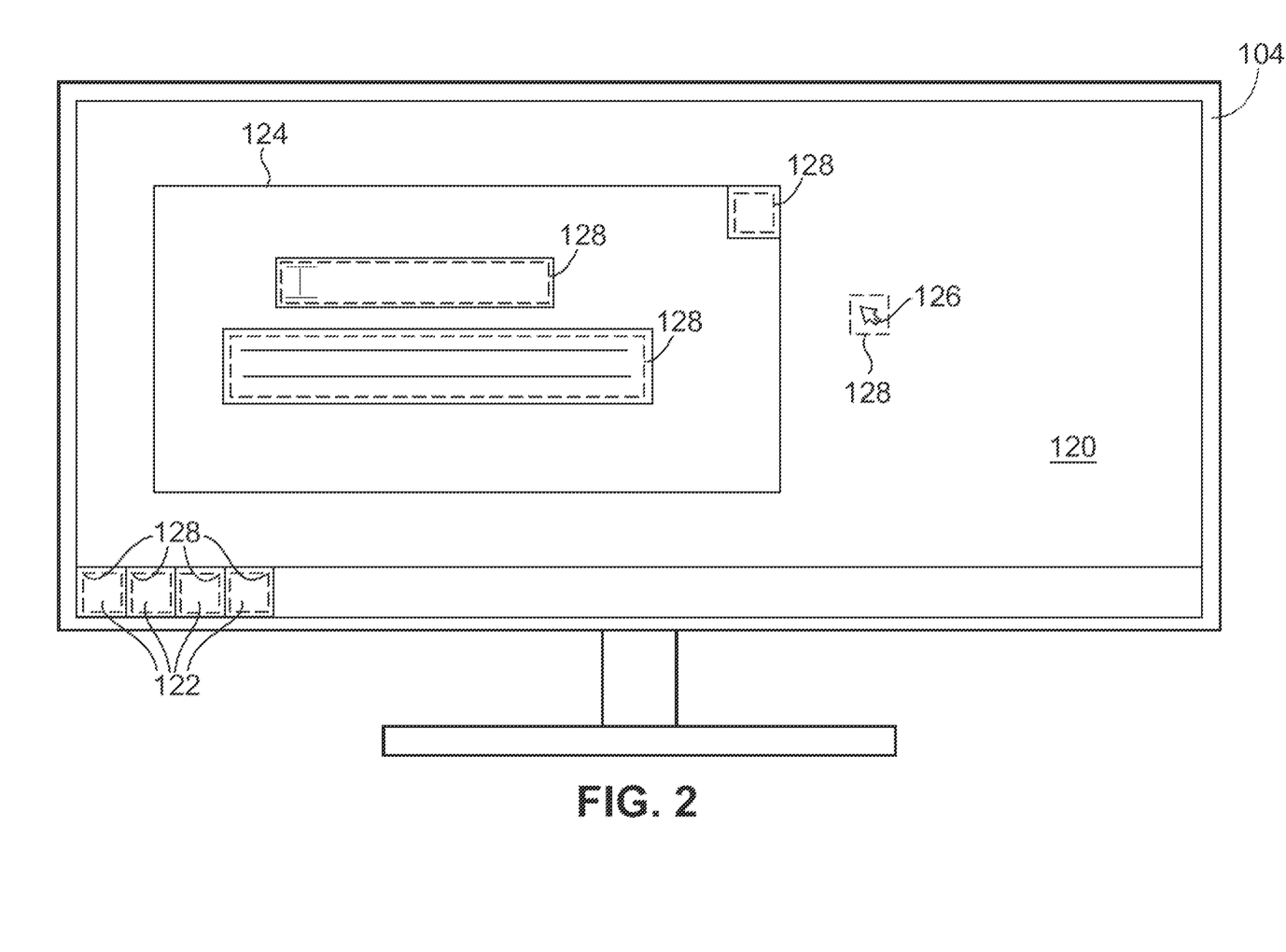
FIG. 2 schematically illustrates an example of a display showing a graphical user interface of an end user device.

FIG. 2 schematically illustrates an example of a display 104 showing a graphical user interface (GUI) 120 of an end user device 100. The GUI 120 shows a plurality of applications, represented by tabs 122 and windows 124, and includes an operating system. The various applications and the operating system comprise a plurality of application-specific GUI-elements. The GUI 120 also comprises GUI-elements that correspond to peripheral user input devices 106, such as a mouse pointer 126. As will be explained in further detail below, the GUI interaction information may comprise bounding boxes 128 used to identify GUI-elements that may be interacted with to perform a given process. For the purposes of illustration, the GUI 120 of FIG. 2 also shows a plurality of bounding boxes 128, each bounding a GUI-element that may be interacted with.

Figure 3:
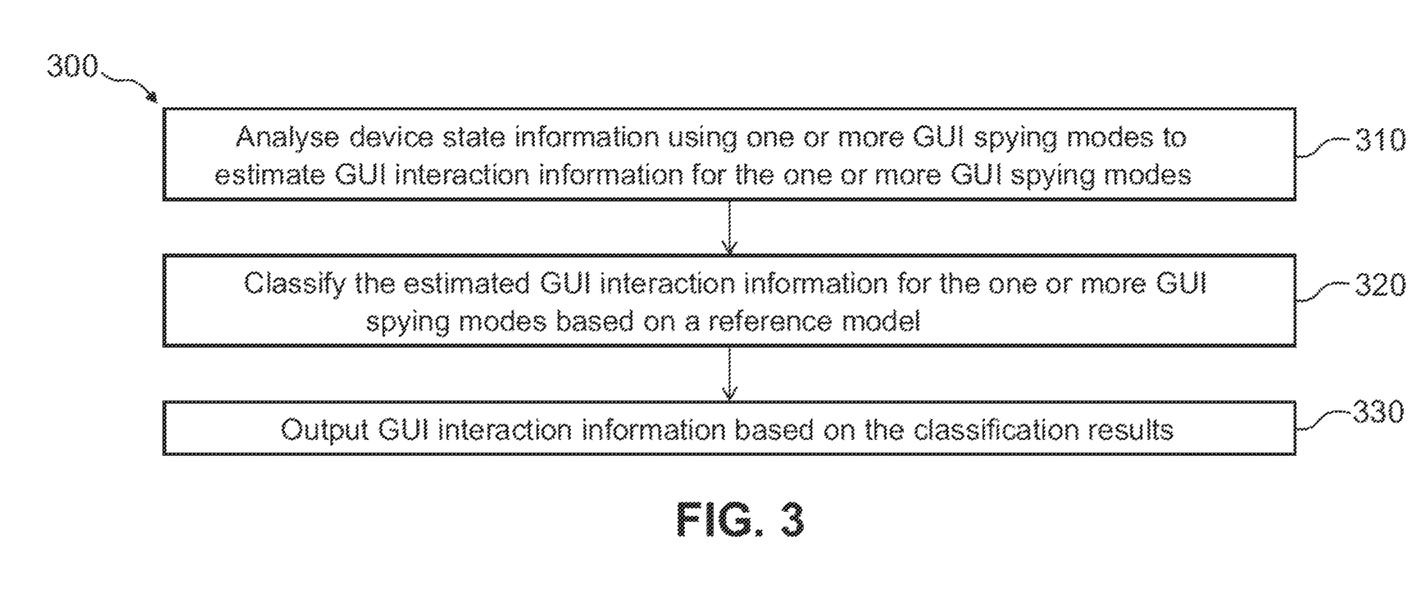
FIG. 3 is a flow diagram of a method according to an embodiment of the invention.

FIG. 3 is a flow diagram of a method according to an embodiment of the invention. The steps of the method 300 presented below are intended to be illustrative. In some embodiments, the method 300 may be accomplished with one or more additional operations not described, and/or without one or more of the operations discussed. Additionally, the order in which the operations of method 300 are illustrated in FIG. 3 and described below is not intended to be limiting.

The method 300 may be implemented in the processing device 114 (e.g., one or more digital processors, analogue processors, digital circuits designed to process information, analogue circuits designed to process information, state machines, and/or other mechanisms for electronically processing information). The processing device 114 may include one or more devices executing some or all of the operations of method 300 in response to instructions stored electronically on the electronic storage device 108. The processing device 114 may include one or more devices configured through hardware, firmware, and/or software to be specifically designed for execution of one or more of the operations of method.

Figure 4:
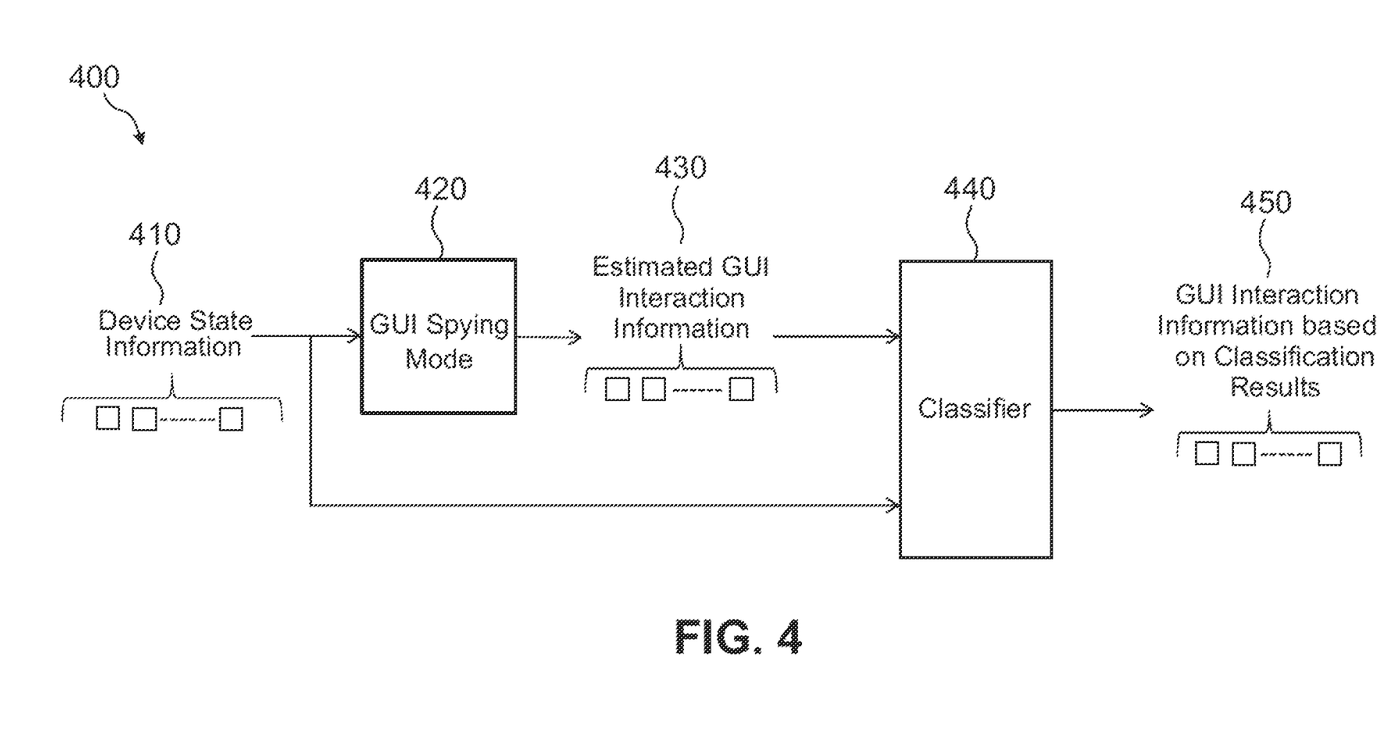
FIG. 4 schematically illustrates information flow according to an embodiment of the invention.

With reference to FIG. 3, at step 310, and with further reference to FIG. 4, which schematically illustrates information flow 400 according to an embodiment of the invention, device state information 410 is analysed using one or more GUI spying modes 420 to estimate GUI interaction information 430 for the one or more GUI spying modes 420. Device state information 410 may comprise user input information, e.g. user input information obtained via user input devices 106, and GUI state information (e.g. information displayed on the GUI 120). Device state information 410 may comprise information pertaining to one or more of key strokes, mouse actions, hover-over events, GUI screenshots, x-y coordinates of a mouse cursor along with other user input and/or GUI state variables.

GUI interaction information provides information on how an operator interacts with a GUI 120 of an end user device 100 to carry out a given process. GUI interaction information may comprise information about GUI-element interaction. GUI interaction information may comprise one or more of coordinates of a bounding box 128 of a GUI-element that has been interacted with, textual information contained within a GUI-element, the name of the application that was interacted with along with other GUI-element attributes.

In order to obtain an estimate of GUI interaction information, i.e. estimated GUI interaction information 430, for given device state information 410, GUI spying modes 420 are employed to analyse the device state information 410.

GUI spying modes 420 provide tools for "spying" on, i.e. monitoring, the GUI 120 and GUI-element interactions. GUI spying modes 420 can include modes for communicating with application programming interfaces (APIs) capable of directly accessing GUI-element attributes through programmatic interfaces stored on the end user device 100. APIs provide software intermediaries that allow applications to communicate with one another. Accordingly, GUI interaction information may be obtained from APIs. The end user device 100 may include a plurality of different APIs.

GUI spying modes 420 can also include various post-processing methods. Post-processing GUI spying modes may involve post-processing of GUI screenshots. Post-processing GUI spying modes may employ optical character recognition (OCR) on GUI screenshots to obtain visible textual information related to one or more GUI-elements. The post-processing GUI spying modes may comprise computer vision tools. Computer vision tools allow for identifying GUI-elements of a GUI 120 through image analysis techniques, such as feature detection, to identify GUI-elements based on known configurations (or appearances) of expected GUI-elements. Computer vision tools may use a machine learning or deep learning algorithm trained to identify particular GUI-elements. The computer vision tools may use optical character recognition techniques to identify text components of identified GUI-elements. The computer vision tools may use standard object detection techniques to identify GUI-elements.

Referring again to FIG. 4, the device state information 410 is provided as input to a GUI spying mode 420 and the output of the GUI spying mode 420 is estimated GUI interaction information 430. In the event that the GUI spying mode 420 is unable to estimate GUI interaction information 430, the GUI spying mode 420 may return an error (not illustrated in FIG. 4). Both the device state information 410 and GUI interaction information 430, 450 may comprise coincident subsets of information, i.e. include a plurality of variables. Device state information 410 may comprise device state information 410 obtained and analysed at a particular instance in time, for example, at every instance of user interaction. Alternatively, device state information 410 may be obtained within a window of time, where the window of time is initiated and terminated by particular user inputs to the end user device or where the window of time is a pre-determined periodic window of time.

In some instances, the GUI state, i.e., that which is displayed on the GUI 120, may change before the relevant device state information 410, to effect the GUI interaction that corresponds to the GUI state change, has been obtained. In some embodiments, device state information 410 (i.e. user input information and GUI state information) may be streamed to a memory device and assigned corresponding timestamps. Accordingly, when estimating GUI interaction information 430 for a particular GUI interaction corresponding to a GUI state change, a GUI spying mode 420 may access and analyse the device state information 410 associated with a timestamp immediately prior to the timestamp of the device state information 410 associated with the change in the GUI state.

Referring again to FIG. 3, at step 320 of the method 300, the estimated GUI interaction information 430 may then be classified based on a reference model, before outputting GUI interaction information 450 based on the classification results at step 330. Referring again to FIG. 4, the device state information 410 and the estimated GUI interaction information 430 is provided as input to a classifier 440, which generates as an output GUI interaction information based on the classification results 450. Classification of the estimated GUI interaction information 430 may comprise assigning scores to the whole of, or subsets of, the estimated GUI interaction information 430 based on a reference model. The assigned scores may be between (and including) 0 and 1, where the assigned score attempts to characterise the accuracy of the estimated GUI interaction information 430. In other embodiments, the classification of the estimated GUI interaction information 430 may comprise the use of a binary classifier, classifying subsets of the estimated GUI interaction information 430 as either true or false based on scores assigned to the whole of, or subsets of, the estimated GUI interaction information 430. Once the estimated GUI interaction information 430 has been classified, step 330 of method 300 of FIG. 3 involves outputting GUI interaction information based on the classification results 450. This output GUI interaction information 450 may subsequently be used for the purposes of intelligent process automation.

The reference model, upon which the classification of the estimated GUI interaction information 430 is based, may comprise a heuristic model based on predetermined rules. The predetermined rules may define thresholds for subsets of the estimated GUI interaction information 430. For example, one such predetermined rule may involve checking that the area of a GUI-element bounding box 128 is below some reasonable threshold that is expected for such GUI-elements to be bounded by. Another example of a predetermined rule may involve checking for vertical and horizontal lines for pixel values within a given GUI-element bounding box 128 provided as part of the estimated GUI interaction information 430 for a given GUI spying mode 420. If there are two vertical lines and two horizontal lines that enclose a mouse action (e.g. a click-position), i.e., if there is a rectangle around the click-position, this suggests that there is a smaller GUI-element bounding box 128 than the one provided by the GUI spying mode 420, and that there has been some sort of error in the estimation of the GUI interaction information 430 by the GUI spying mode 420. Classical computer vision methods can be used to find these lines. These methods may or may not include steps such as: binarisation, Hough transform, filtering, dilation and contraction, canny edge detection and connected components. Yet another example of a predetermined rule involves leveraging the fact that GUI-elements tend to be noisier (in terms of pixel-value variance) than arbitrary larger bounding boxes (since they tend to have more blank space). Knowing this, a predetermined rule may involve providing a threshold on the variance of the pixel-values within a given GUI-element bounding box 128. Over a certain threshold, it can be determined that the bounding box 128 is accurate. The above examples are not intended to be limiting on the predetermined rules and it will be apparent to the skilled person that the above rules merely serve as possible examples of predetermined rules and that it is possible to define more predetermined rules. The heuristic model based on predetermined rules, upon which the classification of the estimated GUI interaction information 430 is based, may include a combination of one or more predetermined rules, where the rules "vote" on whether subsets of the estimated GUI interaction information 430 (e.g. a GUI-element bounding box 128) is correct and the model makes a final decision on whether the estimated GUI interaction information 430 is correct based on a majority vote.

In other embodiments, the reference model may comprise a deep learning model trained on historic data. The historic data may include a large set of examples across all GUI spying modes employed by the intelligent process capture and automation platform and many applications. Each example consists of three elements: 1) a screenshot of a GUI 120, displaying an application or an end user device desktop; 2) estimated GUI interaction information 430; and 3) an assigned score. In order to train a deep learning model, historic data should include correct (positive) and incorrect (negative) GUI interaction information 430 examples. Each correct example has an assigned score of 1.0, and each incorrect example has an assigned score of 0.0, which may be decided manually or automatically. The historic data is separated into two distinct data sets: a training set and a test set. The deep learning model may comprise a residual neural network. The deep learning model can be trained by learning to classify the training set portion of the historic data. The training is performed by updating the weights of the deep learning model with an algorithm called back-propagation. The training procedure makes multiple passes over the training set. The deep learning model can be evaluated on the test set portion of the historic data. The evaluation process may yield the performance of the deep learning model on the test set according to a set of performance metrics, including accuracy, precision and recall.

The method 300 of FIG. 3 can be implemented in a plurality of ways depending on the preference of the operator and/or the computational requirements and constraints of the operating context. Accordingly, the method of the invention can include a serial implementation, a parallel implementation or a combination thereof. In the present context, serial and parallel implementations relate to a) the analysis of device state information 410 using a plurality GUI spying modes 420 to estimate GUI interaction information 430 for the plurality of GUI spying modes 420, and b) the classification of the estimated GUI interaction information 430 for a plurality of GUI spying modes 420 based on a reference model. In other words, in a serial implementation, the estimation of GUI interaction information and subsequent classification of the estimated GUI interaction information 430 is performed for each of a plurality of GUI spying modes 420 sequentially. In a parallel implementation, the estimation of GUI interaction information is performed for a plurality of GUI spying modes 420 concurrently, before the classification of the estimated GUI interaction information 430 is performed for the plurality of GUI spying modes 420 concurrently.

Figure 5A:
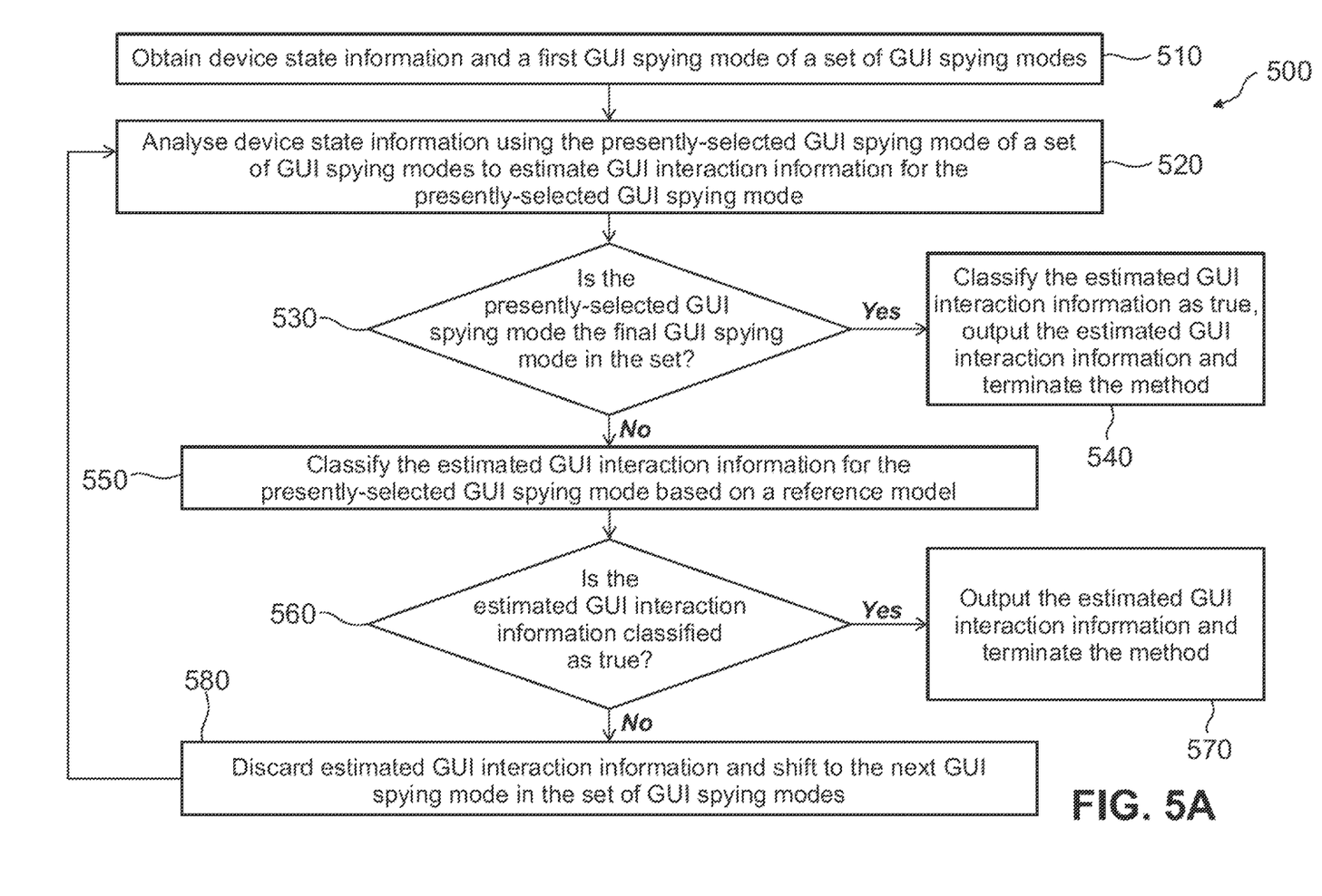
FIG. 5A is a flow diagram illustrating an example of a serial implementation according to an embodiment of the invention.

FIG. 5A is a flow diagram illustrating an example of a serial implementation of a method 500 according to an embodiment of the invention. If computational resource is low, an operator may select a serial implementation according to this exemplary embodiment. At step 510, the method is initialised with data in the form of device state information 410 and a set of GUI spying modes 420 to be employed in a serial manner.

At step 520, the device state information 410 is analysed using the presently-selected GUI spying mode 420 of the set of GUI spying modes to estimate GUI interaction information 430 for the presently-selected GUI spying mode 420. In the first iteration of this embodiment of the method, the presently-selected GUI spying mode 420 will be the first GUI spying mode 420 of the set of GUI spying modes. The set of GUI spying modes may be arranged arbitrarily, with the exception of the final GUI spying mode 420 of the set, or they may be arranged according to pre-determined rules.

At decision step 530, a check is performed to determine whether the presently-selected GUI spying mode 420 is the final GUI spying mode 420 of the set of GUI spying modes. In this embodiment of the method of the invention, the final GUI spying mode 420 of the set of GUI spying modes is reserved for a computer vision tool. The computer vision tool serves as a fall-back GUI spying mode 420 in the event that all of the other GUI spying modes of the set of GUI spying modes fail to yield accurate GUI interaction information. The GUI spying mode results, i.e. the estimated GUI interaction information 430, for the computer vision tool is always classified as true. Accordingly, if the check determines that the presently-selected GUI spying mode 420 is the final GUI spying mode 420 of the set of GUI spying modes, the next step of the method 500 is the step 540, in which the estimated GUI interaction information 430, as estimated by the computer vision tool, is output (as GUI interaction information based on classification results 450) and the method 500 is terminated. If the check determines that the presently-selected GUI spying mode 420 is not the final GUI spying mode 420 of the set, i.e. the computer vision tool, the method 500 proceeds to step 550.

At step 550, the estimated GUI interaction information 430 for the presently-selected GUI spying mode 420 is classified based on a reference model, as has been described above with reference to FIGS. 3 and 4.

At decision step 560, a check is performed to determine the nature of the classification of the estimated GUI interaction information 430 for the presently-selected GUI spying mode 420. If the estimated GUI interaction information 430 has been classified as true, the method 500 proceeds to step 570, in which the estimated GUI interaction information 430, as estimated by the presently-selected GUI spying mode 420, is output (as GUI interaction information based on classification results 450) and the method 500 is terminated. If the check determines that the estimated GUI interaction information 430 has been classified as false, the method proceeds to step 580, in which the estimated GUI interaction 430 of the presently-selected GUI spying mode 420 is discarded and the selected GUI spying mode 420 of the set of the GUI spying modes is shifted to the next GUI spying mode 420 in the set of GUI spying mode and the method 500 subsequently proceeds to step 520 for a subsequent iteration of the method 500. The method 500 is iterated until terminated, i.e. at the point of the first "true" classification of the estimated GUI interaction information 430 and subsequent output of said estimated GUI interaction information based on the classification results 450.

In the embodiment of the method 500, illustrated by FIG. 5A, the serial implementation of the method may not employ every GUI spying mode 420 of the set of GUI spying modes due to the possibility of the method 500 terminating before employing the final GUI spying mode 420 of the set of the GUI spying modes, however, as will be explained in further detail below, it is possible to employ a serial implementation of the method of the invention in which all GUI spying modes are employed regardless of whether a "true" classification of the estimated GUI interaction information 430 occurs before reaching the final GUI spying mode 420 of the set of GUI spying modes.

Figure 5B:
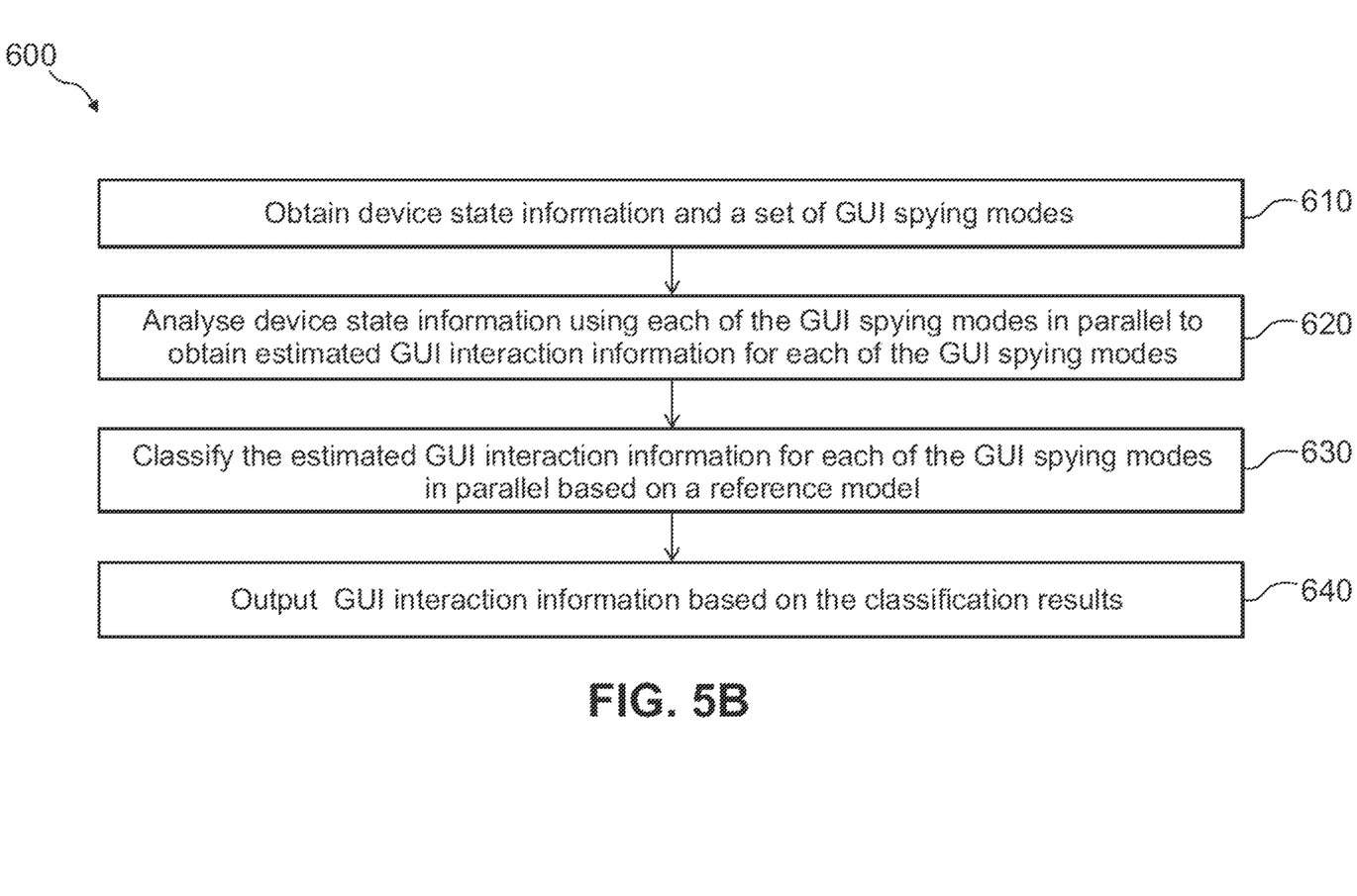
FIG. 5B is a flow diagram illustrating an example of a parallel implementation according to an embodiment of the invention.

FIG. 5B is a flow diagram illustrating an example of a parallel implementation of a method 600 according to an embodiment of the invention. At step 610, the method is initialised with data in the form of device state information 410 and a set of GUI spying modes to be employed in a parallel manner.

At step 620, the device state information 410 is analysed using each of the GUI spying modes 420 of the set of GUI spying modes, concurrently, to estimate GUI interaction information 430 for each of the GUI spying modes 420 of the set of GUI spying modes.

At step 630, estimated GUI interaction information 430 for each of the GUI spying modes 420 is classified, concurrently, based on a reference model, as has been described above with reference to FIGS. 3 and 4.

At step 640, GUI interaction information is output based on the classification results 450 for each of the GUI spying modes 420 of the set of GUI spying modes. As will be explained below, there are a number of ways in which the output can be determined based on the classification results. The following ways in which the output can be determined based on the classification results also apply for a serial implementation of the method of the invention, in which the serial implementation employs the use of each GUI spying mode 420 of the set of GUI spying modes regardless of whether a "true" classification of estimated GUI interaction information 430 occurs before the use of the final GUI spying mode 420 of the set of GUI spying modes.

As previously discussed, classification of the estimated GUI interaction 430 information for a given GUI spying mode 420 may comprise assigning scores, between (and including) 0 and 1, to the whole of, or subsets of, the estimated GUI interaction 430 information based on a reference model. Accordingly, GUI interaction information based on classification results 450 can be output based on said scores. Estimated GUI interaction information 430 may also be classified as true or false for each of the GUI spying modes 420. Accordingly, GUI interaction information 450 may be output based on the aggregation of estimated GUI interaction information 430 that is classified as true.

In one embodiment, the estimated GUI interaction information 430, for a given GUI spying mode 420, with the highest total assigned score is used as output for the GUI interaction information.

In another embodiment, the output GUI interaction information, i.e. the GUI interaction information based on classification results 450, may be comprised of subsets of estimated GUI interaction information 430 from a plurality of GUI spying modes, for example, based on the highest score for each subset of estimated GUI interaction information 430 across the set of estimated GUI interaction information 430 for the plurality of GUI spying modes. For example, the classification results may suggest that the application name for a particular GUI interaction may have been more accurately obtained from one of the API GUI spying modes, whilst the x-y coordinates of a bounding box for a GUI-element interacted with may have been more accurately obtained from the GUI spying mode comprising a computer vision tool. Accordingly, the output GUI interaction information 450 may be comprised of subsets of estimated GUI interaction information 430 from one or more of the plurality of GUI spying modes.

In another embodiment, the whole of, or subsets of, estimated GUI interaction information 430 with scores below a certain threshold, or classified as false, may be filtered out of the estimated GUI interaction information 430. Subsequently, the output GUI interaction information 450 may be based on an aggregation of estimated GUI interaction information 430 that has not been filtered out, i.e. that has an assigned score above a certain threshold, or that is classified as true.

Aggregation of the estimated GUI interaction information 430 for the plurality of GUI spying modes that have not been filtered out may involve, for example, obtaining the mean x-y co-ordinates of the mouse cursor 126, or the mean co-ordinates of a particular GUI-element bounding box 128 or the mode of the application name from the remaining estimated GUI interaction information 430.

As discussed above, the operating context for the present invention is that of platforms for intelligent process capture and automation, which involves the "capture" of, i.e. the recording of, a manual demonstration of a given process. Depending on the preference of the operator and/or the computational requirements and constraints of the operating context, the method of the invention may be performed in a number of ways relative to the manual demonstration of the process.

In one embodiment, the method 300 of the invention may be performed during the manual demonstration process. That is to say, the method 300 may be performed for given GUI interactions as the operator interacts with the end user device to perform the manual demonstration of a process to be automated.

Alternatively, the method 300 of the invention may be performed once the manual demonstration process is complete. An operator may employ this embodiment of the invention in the event that computational resource needs to be preserved during the manual demonstration of a process. In such an instance, the relevant device state information may be streamed to a memory device 112 and saved, as discussed above, for accessing and processing at a later time.

The manual demonstration of a process may comprise serial operator interaction with a plurality of applications. In such an instance, the method 300 according to an embodiment of the invention may be performed for a first application after switching to a second application. For example, an operator may interact with Microsoft Excel before interacting with Microsoft Edge. In such an instance, the method 300 may be performed for the GUI interactions with Microsoft Excel once the operator begins interacting with Microsoft Edge. In such an instance, the relevant device state information 410 may be streamed to a memory device 112 and saved, as discussed above, for accessing and processing at a later time.

Additionally, where the output GUI interaction information 450 for a given application is determined using estimated GUI interaction 430 from a single GUI spying mode 420, an embodiment of the method 300 of the invention may solely employ said GUI spying mode 420 for determining GUI interaction information for subsequent uses of said application. For example, it may be determined that a particular API may be suitable for estimating GUI interaction information 430 for a particular application. Accordingly, whenever said application is used during the manual demonstration process, an embodiment of the method 300 of the invention may be performed where only a single GUI spying mode 420 is used to analyse the device state information 410 to estimate GUI interaction information 430 for that application. This estimated GUI interaction information 430 may be classified as true and subsequently output.

The following is a list of numbered embodiments which may be claimed:

Embodiment 1—A computer implemented method for determining GUI interaction information for an end user device comprising:
analysing device state information using one or more GUI spying modes to estimate GUI interaction information for the one or more GUI spying modes;
classifying the estimated GUI interaction information for the one or more GUI spying modes based on a reference model; and
outputting GUI interaction information based on the classification results.

Embodiment 2—The method of embodiment 1, wherein the one or more GUI spying modes comprise Application Programming Interfaces, APIs, native to the computer.

Embodiment 3—The method of embodiment 2, wherein the estimated GUI interaction information is estimated by accessing GUI interaction information from the APIs.

Embodiment 4—The method of any preceding embodiment, wherein the one or more GUI spying modes comprise post-processing methods.

Embodiment 5—The method of embodiment 4, wherein the post-processing methods comprise computer vision tools.

Embodiment 6—The method of any preceding embodiment, wherein the estimated GUI interaction information is estimated by performing optical character recognition on a GUI.

Embodiment 7—The method of any preceding embodiment, wherein the reference model comprises a heuristic model based on predetermined rules.

Embodiment 8—The method of any one of embodiments 1 to 6, wherein the reference model comprises a multi-modal deep learning model trained on historic data.

Embodiment 9—The method of any preceding embodiment, wherein analysing device state information using the one or more GUI spying modes to estimate GUI interaction information comprises returning an error when an estimate cannot be determined.

Embodiment 10—The method of any preceding embodiment, wherein analysing the device state information and classifying the corresponding estimated GUI interaction information is performed for a plurality of GUI spying modes in series.

Embodiment 11—The method of any one of embodiments 1 to 9, wherein analysing the device state information and classifying the corresponding estimated GUI interaction information is performed for a plurality of GUI spying modes in parallel.

Embodiment 12—The method of any preceding embodiment, wherein classifying the estimated GUI interaction information based on a reference model comprises classifying the estimated GUI interaction information as either true or false.

Embodiment 13—The method of embodiment 12, wherein a final GUI spying mode is a computer vision tool and wherein the corresponding estimated GUI interaction information is classified as true.

Embodiment 14—The method of embodiment 12, wherein classifying the estimated GUI interaction information is terminated when a true classification is determined.

Embodiment 15—The method of embodiment 12, wherein outputting GUI interaction information based on the classification results comprises outputting a first estimated GUI interaction information that is classified as true.

Embodiment 16—The method of any one of embodiments 1 to 11, wherein classifying the estimated GUI interaction information based on a reference model comprises assigning scores to subsets of the estimated GUI interaction information based on the reference model.

Embodiment 17—The method of embodiment 16, wherein outputting GUI interaction information based on the classification results comprises outputting the classified estimated GUI information with a highest score.

Embodiment 18—The method of embodiment 16, wherein outputting GUI interaction information based on the classification results comprises filtering and aggregating the classified estimated GUI interaction information based on the scores.

Embodiment 19—The method of embodiment 18, wherein filtering comprises disregarding subsets of the classified estimated GUI interaction information with scores below a predetermined threshold.

Embodiment 20—The method of embodiment 16, wherein outputting GUI interaction information based on the classification results comprises aggregating classified estimated GUI interaction information with scores above a predetermined threshold.

Embodiment 21—The method of any preceding embodiment, wherein outputting GUI interaction information based on the classification results comprises outputting subsets of classified estimated GUI interaction information estimated using one or more of the plurality of GUI spying modes.

Embodiment 22—The method of any preceding embodiment, wherein the method takes place during a manual demonstration process.

Embodiment 23—The method of embodiment 22, wherein the method is performed once the manual demonstration process is complete.

Embodiment 24—The method of any one of embodiments 22 and 23, wherein the manual demonstration comprises serial interaction with a plurality of applications.

Embodiment 25—The method of embodiment 24, wherein the method is performed for a first application after switching to a second application.

Embodiment 26—The method of any preceding embodiment, wherein, in the event that the output GUI interaction information for an application is estimated using a single GUI spying mode, the single GUI spying mode is used for analysing the device state information for subsequent uses of the application.

Embodiment 27—The method of any preceding embodiment, wherein classifying the estimated GUI interaction information based on a reference model comprises passing the device state information and estimated GUI interaction information to a classifier and outputting classified GUI interaction information.

Embodiment 28—The method of any preceding embodiment, wherein the device state information comprises coincident subsets of device state information.

Embodiment 29—The method of embodiment 7, wherein the predetermined rules define thresholds for the estimated GUI interaction information.

Embodiment 30—The method of embodiment 8, wherein the multi-modal deep learning model trained on historic data comprises a residual neural network.

Embodiment 31—The method of any preceding embodiment, wherein analysing device state information using one or more GUI spying modes to estimate GUI interaction information occurs at every instance of user interaction.

Embodiment 32—The method of any one of embodiments 1 to 30, wherein analysing device state information using one or more GUI spying modes to estimate GUI interaction information occurs at periodic intervals.

Embodiment 33—The method of any preceding embodiment, wherein the device state information comprises device state information obtained at a particular instance in time.

Embodiment 34—The method of any one of embodiments 1 to 32, wherein the device state information comprises device state information obtained within a window of time.

Embodiment 35—The method of any preceding embodiment, wherein the device state information is stored in a memory with a corresponding timestamp.

Embodiment 36—The method of embodiment 35, wherein analysing device state information using one or more GUI spying modes to estimate GUI interaction information comprises analysing the device state information stored in the memory using the one or more GUI spying modes.

Embodiment 37—The method of any preceding embodiment, wherein the device state information comprises user input information and GUI state information.

Embodiment 38—The method of any preceding embodiment, wherein the GUI interaction information comprises GUI-element interaction information.

Embodiment 39—A non-transitory computer readable medium comprising instructions for causing a computer to execute instructions according to the method of any one of embodiments 1 to 38.

Embodiment 40—A system comprising:
a display for displaying a GUI of an end user device; and
at least one processor coupled to the display, the at least one processor configured to execute instructions according to the method of any one of embodiments 1 to 38.

The invention claimed is:

1. A computer implemented method performed on an end user device during a manual demonstration of a process performed by an end user on the end user device, for determining graphical user interface, GUI, interaction information for the end user device, wherein the GUI interaction information provides:
information on how the end user interacts with the GUI of the end user device to perform the process; and
information required by the end user device to automate subsequently the process on the end user device, the method comprising:
providing, as input to each of a plurality of GUI spying modes, a given set of device state information obtained during the manual demonstration, wherein the device state information comprises user input information obtained by the end user device via one or more user input devices connected to the end user device and/or information displayed on the GUI of the end user device resulting from the end user interacting with the end user device during the manual demonstration of the process;
for each of the plurality of GUI spying modes, analysing the given set of device state information to estimate, and provide as output, respective GUI interaction information generated by the end user interacting with the end user device during the manual demonstration of the process, wherein the plurality of GUI spying modes comprise:
one or more Application Programming Interfaces, APIs, native to the end user device for obtaining, through programmatic interfaces stored on the end user device, GUI-element attributes and GUI interaction information; and a computer vision tool for obtaining, through post-processing one or more screenshots of the GUI, GUI-element attributes and GUI interaction information;

providing, as input to a classifier, the given set of device state and the estimated GUI interaction information for each of the plurality of GUI spying modes, classifying, using the classifier, the respective estimated GUI interaction information based on a reference model to provide as output a respective classification of the respective estimated GUI interaction information; and outputting aggregate GUI interaction information based on the classifying, wherein the aggregate GUI interaction information is for use in process automation and comprises one of:

estimated GUI interaction information output from a single GUI spying mode for which the respective classification is a classification of the respective estimated GUI interaction information as true;

one or more portions of estimated GUI interaction information output from two or more of the plurality of GUI spying modes, wherein, for each of the two or more of the plurality of GUI spying modes, the respective classification is a classification of the respective estimated GUI interaction information as true; or estimated GUI interaction information output from the computer vision tool.

2. The method of claim 1, wherein the reference model comprises a heuristic model based on one or more predetermined rules.

3. The method of claim 1, wherein the reference model comprises a multi-modal deep learning model trained on historic data.

4. The method of claim 1, wherein analysing and the classifying is performed using the plurality of GUI spying modes in series or in parallel.

5. The method of claim 1, wherein the classifying comprises classifying respective the estimated GUI interaction information as either true or false.

6. The method of claim 5, wherein a final GUI spying mode in a series of the plurality of GUI spying modes is a computer vision tool and wherein the corresponding respective estimated GUI interaction information is classified as true.

7. The method of claim 5, wherein the classifying is terminated when a true classification is determined, and wherein outputting aggregate GUI interaction information based on the classifying comprises outputting the respective estimated GUI interaction information that is classified as true.

8. The method of claim 1, wherein the classifying comprises assigning scores to subsets of the estimated GUI interaction information based on the reference model.

9. The method of claim 8, wherein outputting aggregate GUI interaction information based on the classifying comprises outputting the classified estimated GUI information with a highest score.

10. The method of claim 8, wherein outputting aggregate GUI interaction information based on the classifying comprises filtering and aggregating the classified estimated GUI interaction information based on the scores.

11. The method of claim 10, wherein filtering comprises disregarding subsets of the classified estimated GUI interaction information with scores below a predetermined threshold.

12. The method of claim 8, wherein outputting aggregate GUI interaction information based on the classifying comprises aggregating classified estimated GUI interaction information with scores above a predetermined threshold.

13. The method of claim 1, wherein outputting aggregate GUI interaction information based on the classifying comprises outputting subsets of classified estimated GUI interaction information estimated using the plurality of GUI spying modes.

14. The method of claim 1, wherein the analysing occurs at every instance of user interaction.

15. A non-transitory computer readable medium comprising instructions for causing a computer to execute instructions according to the method of claim 1.

16. A system comprising:

a display for displaying a GUI of an end user device; and at least one processor coupled to the display, the at least one processor configured to execute instructions according to the method of claim 1.

* * * * *